United States Patent [19]
Seddon et al.

[11] Patent Number: 5,872,655
[45] Date of Patent: Feb. 16, 1999

[54] MONOLITHIC LINEAR VARIABLE FILTER AND METHOD OF MANUFACTURE

[75] Inventors: Richard I. Seddon; Basil L. Swaby; Richard J. Ryall; Scott E. Solberg; Erik W. Anthon, all of Santa Rosa, Calif.

[73] Assignee: Optical Coating Laboratory, Inc., Santa Rosa, Calif.

[21] Appl. No.: 851,407

[22] Filed: May 5, 1997

Related U.S. Application Data

[63] Continuation of Ser. No. 498,515, Jul. 5, 1995, abandoned, which is a continuation of Ser. No. 44,535, Apr. 7, 1993, abandoned, which is a continuation-in-part of Ser. No. 727,640, Jul. 10, 1991, abandoned.

[51] Int. Cl.$^6$ .............................. G02B 1/10; G02B 5/28
[52] U.S. Cl. ..................... 359/588; 359/359; 359/589; 359/590; 427/162; 427/167; 427/266; 427/269; 427/282; 427/289; 427/523; 427/527
[58] Field of Search .................................. 427/162, 167, 427/266, 269, 282, 289, 523, 526, 527, 579, 585; 359/580, 588, 589, 590, 359, 584; 356/416

[56] References Cited

U.S. PATENT DOCUMENTS

| | | | |
|---|---|---|---|
| 3,442,572 | 5/1969 | Illsley et al. ............................. | 359/589 |
| 4,428,980 | 1/1984 | Nakamura et al. ...................... | 427/167 |
| 4,957,371 | 9/1990 | Pellicori et al. ......................... | 359/586 |
| 5,138,222 | 8/1992 | Toide et al. .............................. | 359/580 |
| 5,209,690 | 5/1993 | Yriens et al. ............................. | 427/167 |
| 5,218,473 | 6/1993 | Seddon et al. .......................... | 359/589 |
| 5,272,518 | 12/1993 | Vincent .................................... | 356/416 |
| 5,283,692 | 2/1994 | Herbst .................................... | 359/589 |

*Primary Examiner*—Cassandra C. Spyrou
*Assistant Examiner*—John Juba, Jr.
*Attorney, Agent, or Firm*—Workman, Nydegger & Seeley

[57] ABSTRACT

A process suitable for forming multi-layer (up to at least several hundred layers) monotonic/linear variable/wedge filter coatings on a single substrate surface and for forming monolithic filter assemblies which incorporate such filters, is disclosed along with the designs for such filters. The monolithic process uses radially variable filter fabrication techniques in combination with ion-assisted deposition to form stress controlled, radially variable filter coatings of the desired varied optical profile, preferably using high and low index materials stich as tantala and silica. Stress is minimized by balancing the amount of ion assist and the coating rate. Slices are cut radially from the substrate to form quasi-linear variable filters. Other coatings such as, but not limited to, a wide band hot mirror can be formed on the opposite surface of the substrate from the radially variable LVF method. The method forms complex multi-layer thick filters with high yields on a single substrate surface such that the filter is free of precession or sideways leakage of light between the parallel surfaces. Also disclosed is an optical filter having stacks arranged so that the magnitude of the characteristic center wavelength of each stack increases from stack to stack along the desired direction of traversal of incident light through the filter. As a result of this sequential construction, diffuse leaks are blocked from transmission through the filter. The diffuse leak-suppressed filter can be formed by various processes, including the monolithic process.

15 Claims, 4 Drawing Sheets

MONOLITHIC LINEAR VARIABLE FILTER AND METHOD OF MANUFACTURE

I. CROSS-REFERENCE TO RELATED APPLICATION(S)

This application is a continuation of commonly assigned U.S. patent application, Ser. No. 08/498,515, filed Jul. 5, 1995 abandoned, which is a continuation of commonly assigned U.S. patent application, Ser. No. 08/044,535, filed Apr. 7, 1993 abandoned; which is a continuation-in-part of commonly-assigned U.S. patent application, Ser. No. 07/727,640, entitled MONOLITHIC LINEAR VARIABLE FILTER AND METHOD OF MANUFACTURE, filed Jul. 10, 1991 abandoned, in the name of inventors Richard I. Seddon, Basil L. Swaby, Richard J. Ryall, and Scott E. Solberg.

II. BACKGROUND OF THE INVENTION

A. Field of the Invention

The present invention relates to optical filters and, in particular, to the design and fabrication of wedge filters, including narrow band linear-variable filters, multi-layered monolithic linear variable filters, and linear variable filters which substantially eliminate the transmission of precessive and/or diffuse leaks.

B. Description of the Related Technology

In order to be useful in most applications, an optical filter which is designed to transmit only a given narrow band of wavelengths must sufficiently reject all other wavelengths for which source energy and detector sensitivity both exist. That is, light of all other wavelengths outside this narrow spectral band and within a range set by the limits of the source and the detector must be blocked in order for the filter to operate with the given source and detector. In the case of induced transmittance or Fabry-Perot-type metal dielectric filters, the rejection occurs naturally and such filters can be designed with wide-band blocking without complicating the design of the filter.

All-dielectric bandpass filters can be much more environmentally stable than metal dielectric filters and are preferred in many applications. Their disadvantage is that the bandpass provides natural blocking for only a narrow band of wavelengths above and below the pass band. Additional blocking requires additional stacks of layers, each stack blocking a specific range of wavelengths. The additional blocking is generally provided by several quarterwave optical thickness (QWOT) stacks. A quarterwave stack is characterized by its center wavelength in that the stack biocks light by reflection over a wavelength range around its center wavelength. The width of the wavelength range of the stack depends on the stack configuration and the ratio of the indices of refraction of the two coated materials used in the stack. The depth of blocking is controlled by the number of layers in the stack.

It is not uncommon for the all-dielectric filters sold by companies such as the assignee, Optical Coating Laboratory Inc., and others, to have upwards of 200 total layers. Typically, only a relatively few such layers can be formed on a single surface. Thus, these layers must be distributed over several surfaces, for example, over two to four surfaces on one or two substrates, to minimize and balance coating stresses. Otherwise, the use of two substrates with a small air space is acceptable, and in a number of applications it is perfectly acceptable to coat two surfaces of the same substrate.

An exception is found in linear-variable narrow-band filters. These are filters in which the thickness of the coating layers, and hence the wavelength of the pass band, is varied linearly, or at least monotonically, along a dimension of the filter. If such a filter is used in conjunction with an extended detector such as a linear array, it is desirable to mount the filter with the wavelenth-defining bandpass layers on a surface very close to the array. Where blocking layers are on other parallel surfaces, if energy from the source is not all at normal incidence, it is possible for some of the non-normal energy to enter past the blocking filters at one point in the filter detector or assembly and to precess between parallel surfaces and reemerge anomalously at another point on the filter. A full description of this phenomenon is given in the commonly assigned, co-pending patent application of Seddon and Swaby, U.S. Ser. No. 07/550,255, entitled LEAKAGE CORRECTED LINEAR VARIABLE FILTER, (also called the "Seddon, Swaby patent application"), which patent application is incorporated by reference. The solution disclosed and claimed in the incorporated Seddon, Swaby patent application involves a specific geometry in which parallel coated surfaces are avoided. This solution is effective, but still requires the production of multiple wedge filters in carefully matched sets to cover the desired range of wavelengths.

In addition to the above-discussed precessive leakage phenomenon, so-called "diffuse leaks" have been a serious problem in all-dielectric linear variable filters. Diffuse leaks were found in certain infrared filters some 15 years ago. The problem was thought to be caused by scatter in one of the coating materials (cadmium selenide) used in the filters. Diffuse leaks in visible filters have not usually been a major problem, partly because the materials used for such filters have had low scatter, and partly because there were no applications for visible filters requiring that the filter be positioned close to the detector. In contrast, in LVF filter devices, the filter is placed very close to the detector array, the coating materials are somewhat scattering, and (as discussed above), the filter contains a very large number of layers. As a consequence, diffuse leaks are observed in these filters.

Although the mechanism by which so-called diffuse leaks occur is not well understood in the prior art, it is our understanding that such leaks may occur when the individual layers of the filter have rough surfaces, when there exist imperfect between-layer interfaces, or as described above, when the individual layers of the filter contain light scattering material. Regardless of how many layers the stack contains, if the stack contains scattering materials or interfaces, some of the light will be scattered at high angles and exit the stack. (These diffuse leaks are not to be confused with specular leaks, which go straight through the stack.)

Referring how to FIG. 5, there is shown a schematic of a stack portion 40 of a conventional shortwave blocking filter. Ray 57 represents both the band of spectral radiation that the filter is designed to pass, as well as the designed/intended direction of traversal of that band through the filter from the entrance side 55 of the stack to the exit side 65. Illustratively, the stacks of the filter are quarter wave blocking stacks having center wavelengths 1.75 $\lambda_o$, 1.44 $\lambda_o$, 1.21 $\lambda_o$, and 1.0 $\lambda_o$. Light schematically depicted as rays 58–61, which the stacks are designed to block, should be reflected back or blocked, as indicated at 58A–61A. However, as the result of the above-mentioned defects in the various constituent layers of the filter, the light 58–61 may be partly scattered along directions such as 58B–61B. As indicated at 58C–61C, this scattered light may exit the analyzer side 65 of the optical filter device at a large angle. Because the linear variable filter in positioned very close to the associated detector array, the resulting high-angled diffuse leaks 58C–61C may form a significant portion of the radiation reaching the detector (not shown) and thus may give rise to anomalous or erroneous operation of the device.

Because in many cases It is not possible to eliminate the scattering, it is desirable to have available means for preventing or at least reducing the diffuse leaks.

III. SUMMARY OF THE INVENTION

In one aspect, out invehtion embodies the discovery that a wedge filter can be formed of very many layers deposited on a single substrate surface by forming the filter coating on the substrate using variable filter fabrication techniques adapted to provide radial variation, in combination with ion-assisted deposition (IAD) and balancing the degree of ion assist and the coating rate to control stress. The filter is then cut from a radial section of the substrate disk. The resulting radial slice effectively is a wedge filter which can incorporate several hundred layers on a single substrate surface without the normally expected yield losses due to stress and fracture. Ordinarily, stress would destroy such a filter or at least make it unsuitable for its intended purpose. Because of this many-layer capability, the filter coatings can be formed on a single substrate surface, thereby precluding light precession and leakage due to parallel coated surfaces, without requiring the carefully matched sets used in the specific geometry approach (non-parallel coated surfaces) taught by the referenced Seddon, Swaby patent application. Also, the filter is stable as determined by standard humidity and environmental tests. As a consequence, we have formed complex, many-layer, stable, all-dielectric linear variable filters such as bandpass filters on only one surface of a substrate, thus precluding precession-induced leaks. In addition, due to economies of scale, the technique permits forming a relatively large quantity of complex filters at relatively low unit cost.

In another aspect, our invention embodies the discovery that when stacks within an optical filter are arranged so that the magnitude of the characteristic center wavelength of each stack increases from stack to stack along the direction of traversal through the filter of the narrow band of incident light which the filter is designed to transmit ("the designed direction of traversal"), diffuse leaks are substantially blocked, and eliminated. The light scattered at a high angle in one stack cannot go through the next stack, which has a greater center wavelength, because the apparent center wavelength of this stack at the steep angle is shifted toward a shorter wavelength (blue shift), matching the light leaking through the first stack. The second stack, and each successive, longer center-wavelength stack, reflects back the leaked light from the previous stack, to a direction substantially opposite to the designed direction of traversal of the band of transmitted light.

In short, our invention is embodied in optical LVF filters and associated fabrication processes in which the constituent filter coatings ate implemented in a monolithic design on a single surface of a substrate and/or in an ordered stack, so that precessive and/or diffuse leaks are eliminated.

IV. BRIEF DESCRIPTION OF THE DRAWING

The above and other aspects of the invention are described with respect to the drawing, in which.

V. DETAILED DESCRIPTION OF THE PREFERRED EMBODIMENT(S)

A. Monolithic, Precessive Leak-Suppressed LVF

Figure 1:
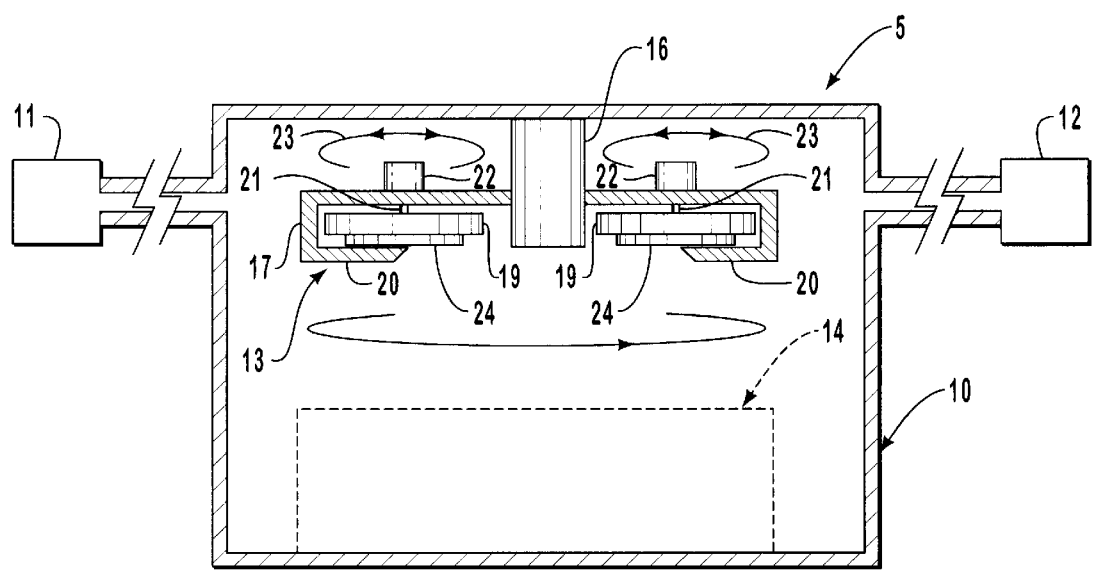
FIG. 1 is a vertical section view, in schematic form, of a presently preferred embodiment of a vacuum chamber used to form LVFs in accordance with our process, which embody our LVF design.

FIG. 1 schematically depicts an ion-assisted deposition (IAD) system 5 which is suitable for forming multiple layer, stress-controlled optical coating filters in accordance with the present invention. The illustrated vacuum system 5 uses variable filter fabrication technology which is modified by the use of ion-assisted deposition (IAD), and by controlling the IAD parameters, to control the stress of the deposited film. This variable fabrication technology also provides radially oriented wedge/linear/monotonically variable filter coatings.

For the purposes of this document, ion assisted deposition is defined as a physical vapor deposition process accompanied by ion bombardment of the depositing film. Ion bombardment may be simultaneous with deposition or the two processes may be sequential, provided that only a small thickness of the film (for example, less than about two monolayers) is deposited before exposure to ion bombardment. Typically, ion energies may range from a few tens of eV's to a few hundreds of eV's. Ions may be formed from atoms or molecules of oxygen, nitrogen, inert gases such as argon, or any combination or mixture of these gases. Ion assistance may be used to enhance the stoichiometry of the deposited film, and/or to increase the density of the film or to make film stresses more compressive or less tensile.

The system 5 includes a vacuum chamber 10 which is evacuated by suitable vacuum pump means 11 comprising one or more vacuum pumps. The chamber 10 is fed processing gases such as oxygen by suitable source(s) 12 of pressurized gas. The chamber 10 includes a planetary substrate transport system 13, which is mounted to the top plate of the housing or chamber 10 as depicted in FIG. 1, and an ion-assisted deposition (IAD) system 14, depicted in detail in FIG. 2, which is mounted to the bottom plate of the chamber.

Referring further to FIG. 1, the substrate planetary transport system 13 comprises a rotatable main shaft or sun shaft 16. The shaft 16 can be mounted to the top Wall of the chamber 10 and coupled through that wall by a conventional through-the-wall vacuum coupling (such as a ferrofluidic coupling, not shown) and driven by a computer-controlled drive motor (not shown) located outside the chamber. A mask-support housing 17 is fixedly mounted to the shaft 16 for rotation with the shaft along path 18. A plurality of substrate holders 19 are mounted on rotatable planetary spindles 21 which depend from housing 17 and are rotated by shaft 16 and gearing 22 along paths 23. Substrates 24 are mounted to each holder 19. Deposition from system 14 onto the substrates 24 is controlled by masks 20, which are fixedly mounted to the bottom of the housing 17 between the associated holders and substrates 24 and the deposition system 14.

As a consequence of the above-described arrangement, rotation of the associated holders and substrates along paths 23 relative to the masks 20 selectively exposes the substrates to the deposition gases from system 14, in a manner determined by the configuration of the masks, to deposit thin films of controlled composition and profile on the substrates. Also, the holders 19 and substrates 24 are drive through double planetary rotation along paths defined by the combination of rotational paths 18 and 23, while the mask in fixed relative to the rotational path 23, thereby eliminating deposition non-uniformities. As a consequence of the masked deposition using the specially configured masks and the planetary movement, optical thin film coatings of controlled radially variable profile can be formed on the substrates. Furthermore the use of ion assisted deposition permits precise control of the stress of the depositing film, allowing us to form complex multi-layer coatings comprising several hundred layers on a single substrate surface.

Figure 2:
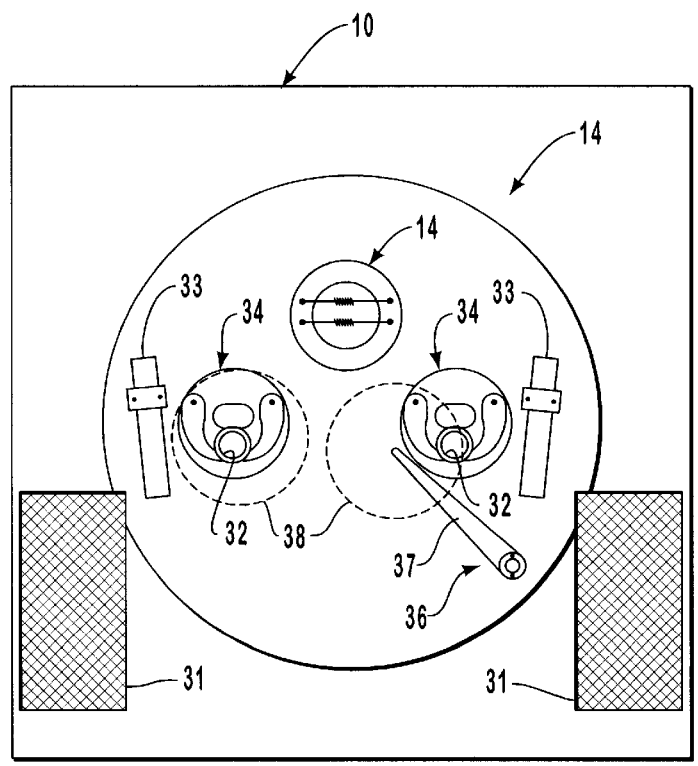
FIG. 2 is a planar section taken along line 2—2 in FIG. 1, illustrating the deposition system 14 of FIG. 1.

Referring now to FIG. 2, the deposition system 14 includes a pair of heaters 31–31 which maintain the appropriate temperature for fabrication of the thin film coatings, presently about 220° C. The heaters 31 preferably are mounted on the ceiling of chamber 10. Illustratively, two sources 32, that is, containers of source material such as $SiO_2$ and $Ta_2O_5$ are mounted to the bottom wall of the chamber 10. During vacuum operation, depleted source material in the sources 32 can be refilled using a conventional swing arm reloader 33. A conventional electron gun 34 is associated with each source 32, that is, positioned adjacent each source, for effecting electron beam evaporation of the source material. In addition, one or more IAD devices 35 are mounted in the bottom chamber wall for enhancing and controlling the deposition process.

A swing arm shield means 36 comprising a swing arm 37 which is pivotally mounted to the bottom wall of the chamber and carries a metal shield 38 at its free end is operated under the control of the system computer for controlling the deposition of the associated source material. (Please note, to facilitate illustration, the swing arm 37 is not shown for one of the shields.) Specifically, with its associated shield 38 over and closely adjacent to the source 32, the swing arm shield means physically isolates the source from its electron beam and from the overhead substrates, thus precluding deposition operation. This, despite the fact that the chamber 10 is otherwise operating in the deposition mode, i.e., at deposition temperature and with the devices 34 and 35 operating. To effect deposition from the associated source 32, the associated shield 38 is pivoted away from the source, to uncover the source to the electron beam and to the substrates, so that the source material is evaporated and deposited on the substrates.

The amount of ion assist is varied by balancing the ion current and ion energy. We control stress in the depositing film, i.e., we minimize that stress or, alternatively, provide a desired magnitude of tensile or compressive stress, by controlling the ratio of the ion assist to the coating rate (the evaporant flux from the sources(s) 32). In addition to controlling the amount of ion assist and the coating rate to control and typically minimize stress, the adaptation of IAD technology to the variable filter fabrication technique provides dense, moisture-free films which do not shift in wavelength with changes in relative humidity in the environment or as a result of aging.

Typically, in a system configured for the deposition of alternating layers of high (H) and low (L) index of refraction materials such as, preferably, the high refractive index material tantala ($Ta_2O_5$) and the low refractive index material silica ($SiO_2$), one deposition source 32 contains the high index material and a second deposition device 32 is used for depositing the low index material. By operating the system 5 (including devices 34 and 35) continuously and by alternatively/selectively covering and uncovering the sources using the shield means 38, alternating layers (or essentially any selected sequence of layers) of L and H material can be formed.

After a depositions a number of filter slices are cut radially from the disk substrate. The slices are narrow enough so that the arcs of constant uniformity across the width of the filter effectively approximate straight lines. The resulting radially variable filters have the desired near-linear thickness characteristic as a function of radius. The slight resulting curvature of the thickness contours of each linear filter is acceptable in most applications. In addition to the wedge-type coating, other coatings such as, for example, the wide band hot mirror coating (WBHM) described in the discussion of FIG. 3, can be formed on the opposite side (opposite major surface) of the substrate 24 prior to cutting the filters from the substrate.

In a presently preferred embodiment, the IAD devices are ion guns, preferably one such as the End Hall ion gun described by Kaufman, Robinson and Seddon in J. Vac. Sci. Tech. A, Vol. 5, No. 4, July–August, 1987, p. 2081. To assist the electron-beam evaporation and deposition of metal oxide dielectric coatings such as the high index material tantala and the low index material silica, the ion gun is operated using a target of the appropriate metal (tantalum or silicon) and oxygen gas is supplied into the chamber so that an oxidizing plasma is formed. Please note, IAD is highly desirable because, in addition to providing stress control, it permits deposition of all of the variable bandpass and blocking coatings on one surface, thus avoiding cross-talk problems and substantially increasing the typical coating yields from the yields expected using conventional technology, which will be much lower because of failures due to tantala absorption and because of tensile failures (craze).

This new technique allows us to produce stable all-dielectric linear-variabie bandpass filters in which only one surface receives the wedge or linear coating. As mentioned, the technique has the additional advantage that such filters can be produced in relatively large quantities at low unit cost. In fact, our new radially variable ion-assisted deposition technique forms radially variable filters having a desired near-linear thickness characteristic as a function of radius. Using preferred materials such as tantala or niobia for the high index material and silica for the low index material, we have found to our surprise that, presently, linear variable filters having as many as 240 or more layers and a physical thickness of 24 microns can be deposited on each side of the substrate without excessive stress. The radially variable filter coating can be cut into the small linear filters without the fracture loss normally expected from such thick and complex filters. The filters are stable within our measurement capability under all conditions of humidity and all conventional environmental testing.

1. Monolithic LVF Example

Figure 3:
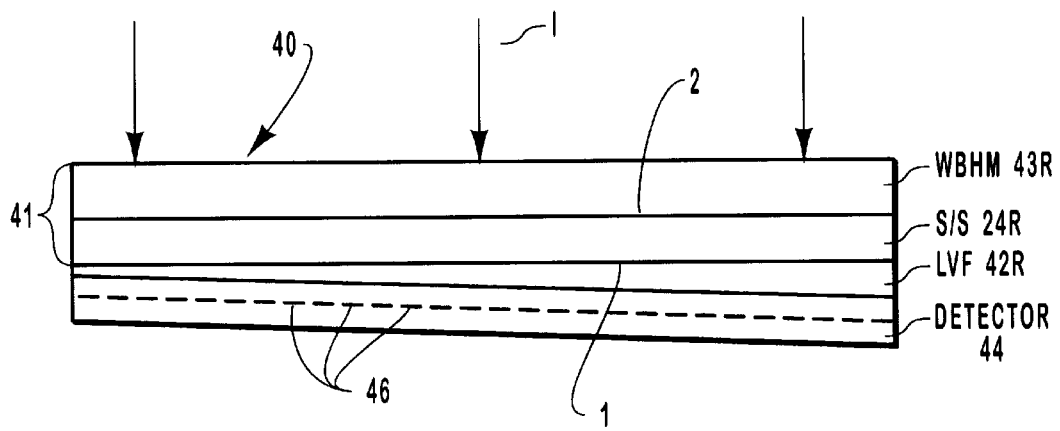
FIG. 3 is a vertical cross-section in schematic form (not to scale) through ah LVF detector device designed and fabricated in accordance With out present invention.
Figure 4:
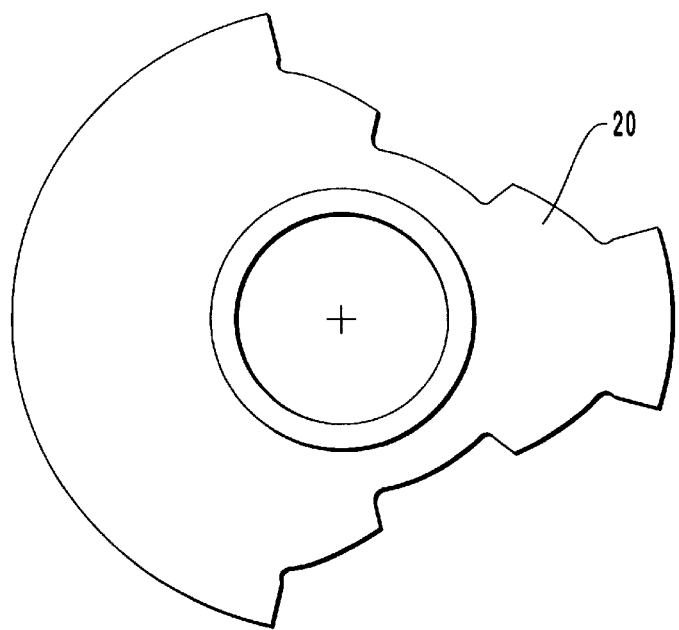
FIGS. 4 is an exemplary mask used in the apparatus of FIGS. 1 and 2 to manufacture the LVF of FIG. 3.

Referring to FIG. 3, there is shown a specific example of a monolithic LVF-type wedge filter assembly 40 made in accordance with our persent invention using the mask configuration of FIG. 4. The assembly 40 comprises a linear variable filter slice 41, which itself includes a radially cut, optically clear substrate section 24R hating the wedged shaped filter coating 42R formed on one surface (surface 1) and a broad band heat reflector-visible transmitting filter 43R, called a wide-band hot mirror (WBHM), formed on the opposite side or major surface (surface 2). A conventional detector array 44 of diode elements 46 is mounted adjacent the LVF 42R, on the opposite side of the filter relative to the monitored incident radiation I.

The described multi-layer thin film dielectric interference filter 41 transmits a discrete wavelength band as a function of physical position along the length 1 of the transparent substrate 24R. Over 400 alternating low and high index layers comprising the LVF 42R and the WBHM 43R are deposited on the two opposite major surfaces of the substrate to obtain the desired filtration. The wedged filter 42R deposited on surface 1 forms a geometric thickness ratio of approximately two-to-one (however, other wedge ratios are readily possible). Low out-of-band transmittance over an extended spectral range is attained by positioning seven periodic symmetrical multi-layer thin film stacks so that the stop bands (regions of high reflectance or low transmittance) of each stack is overlapped with the adjacent stacks. A multi-cavity interference filter coating which provides a rectangular spectral pass band of selected width is also deposited on surface 1. The technique of equivalent layers is used to minimize the inband secondary reflectance maxima. Surface 2 is coated using the same coating materials as surface 1 to provide the wide band hot mirror 43R. This filter coating comprises three periodic symmetrical multi-layer thin film blocking stacks separated by auxiliary matching layers to reduce secondary reflectance maxima in the spectral wavelength region of 380 nanometers (nm) to 720 nm. The integrated transmittance in the stop band which spans 750 nm to 1300 nm is less than 0.008 percent. The specific design requisite is the application of extended pass band and equivalent index theory.

The composite filter provides continuously discrete pass bands from 380 nm to 720 nm and blocking from x-ray to near-infrared 1300 nm. Additional features/characteristics are:

1) Uses two coating materials (L=$SiO_2$, Silicon Dioxide and H=$Ta_2O_5$, Tantalum Pentoxide) to attain the above mentioned spectral performance;

2) Filter has low scatter, low absorption, is rugged, and is moisture and temperature stable;

3) Filter operates in a convergent or divergent beam having an optical cone angle range of f/∞ (collimated) to f/2 (or numerical aperture 0.25);

4) Two surfaces are coated with a plurality of alternating low and high index materials to attain an optical signal to noise ratio (S/N) greater than Optical Density (OD) 4. The optical signal to noise ratio is defined as the log10 of the ratio of the in band energy to the out of band energy, expressed in OD:

$$S/N = \log_{10}\left(\frac{\int_{\lambda_2}^{\lambda_3} T(\lambda)f(\lambda)D(\lambda)d\lambda}{\int_{\lambda_1}^{\lambda_2} T(\lambda)d\lambda + \int_{\lambda_3}^{\lambda_4} T(\lambda)d\lambda}\right) \text{ where } \begin{array}{l}\lambda_1 = 300 \\ \lambda_4 = 1300\end{array};$$

and where $f(\lambda)$ and $D(\lambda)$ are the flux and the detector response;

5) A rectangular-shaped, pass band region having a deliberate Full Width at Half Maximum (FWHM) and high pass band transmittance is realized for the spectral wavelength region 380 nm to 720 nm;

6) The FWHM decreases at shorter wavelengths primarily because of the increase in refractive index of the high index material; and 7) The physical thickness of the wedged coating is designed for and controlled to produce a variable band pass filter having a wedge ratio of approximately 2 to 1.

B. Diffuse Leak-Suppressed LVF

Figure 6:
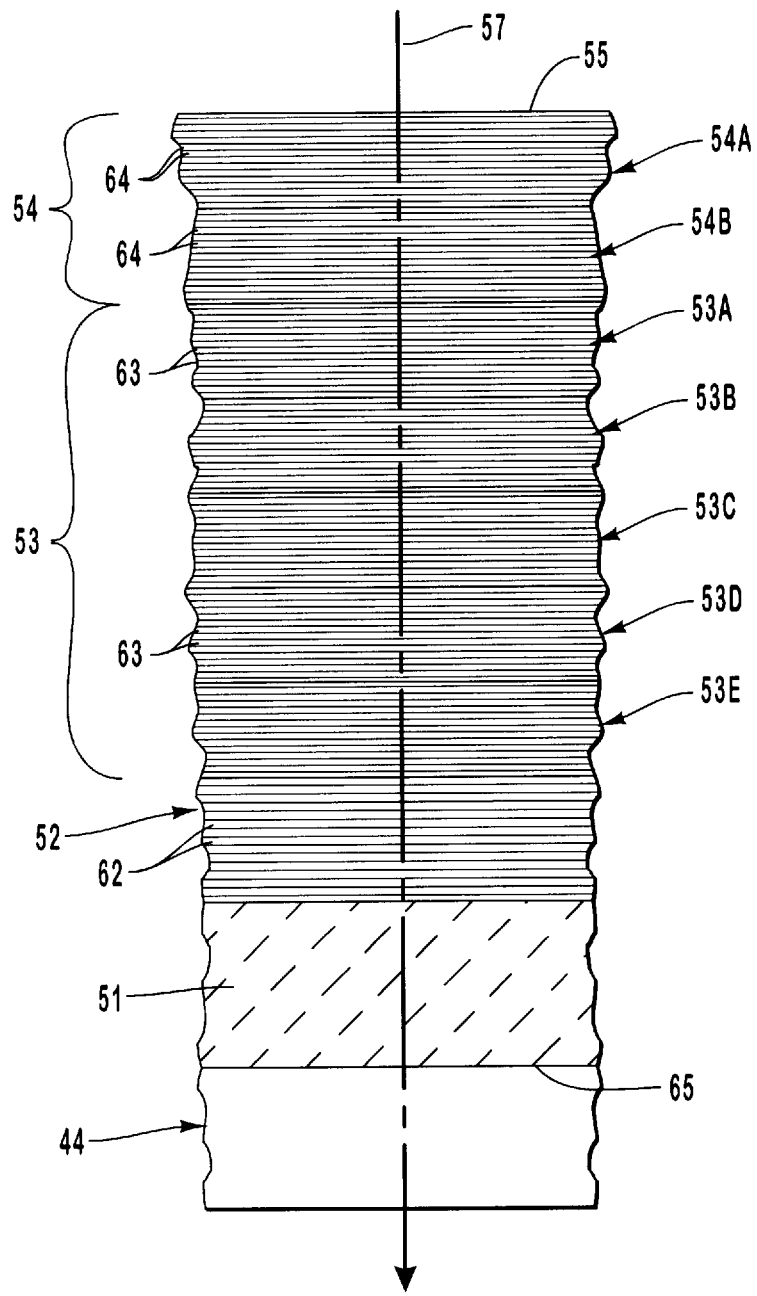
FIG. 6 is a schematic vertical cross-section view, not to scale, of a portion of an LVF comprising stacks arranged such that the characteristic or center wavelength of each stack increases from stack to stack along the designed direction of traversal of light through the filter, in accordance with a diffuse leak rejection embodiment of our present invention.

Referring to FIG. 6, there is shown a schematic diagram of an exemplary linear variable filter (LVF) 50 which incorporates other aspects of our invention, specifically, diffuse leak suppression. The LVF 50 can be formed using the above-described radial slice fabrication technique, to provide a stress-controlled multi-layer embodiment, or can be formed using conventional fabrication techniques when the stress-controlled, multi-layer construction and/or the suppression of precessive leaks is not required. The exemplary LVF 50 includes a substrate 51, a bandpass filter 52 formed on the substrate, at least one set 53 of relatively shortwave blocking quarterwave stacks 53A–53E, at least one set 54 of longwave blocking quarterwave stacks 54A and 54B, and a detector 44 such as a conventional photodiode array.

The substrate 51 preferably is clear glass, but can be formed of several other suitable transparent materials well known to those of usual skill in the art.

The bandpass kilter 52 deposited on the substrate 51 preferably comprises a series of light-blocking layers 62. Typically, the layers 62 comprise the materials tantala and silica and, in addition to deposition by the above-described preferred IAD approach, can be deposited by processes such as sputtering, including ion beam sputtering, by evaporation, including electron beam evaporation, and by plasma plating, etc.

Figure 7:
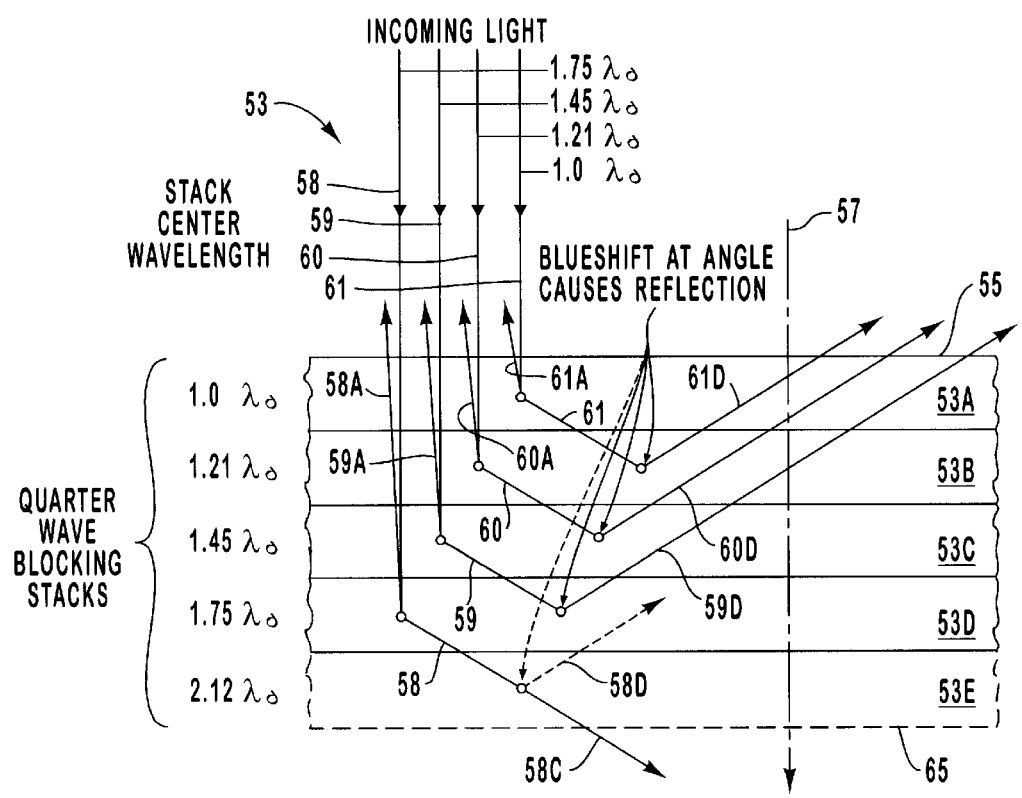
FIG. 7 is a schematic vertical cross-section view, not to scale, depicting the rejection of diffuse leaks in a portion of the optical filter shown in FIG. 6.

In one preferred embodiment, the exemplary set 53 of shortwave blocking quarterwave stacks 53A–53E deposited on the bandpass filter 52 comprises layers 63—63 of the materials tantala and silica formed by IAD. As depicted in FIG. 7, the shortwave set 53 comprises five stacks 53A–53E. Four stacks 53A–53D are quartetwave blocking stacks for blocking incident light over the range 1.0 $\lambda_o$, 1.21 $\lambda_o$, 1.45 $\lambda_o$, and 1.75$\lambda_o$. The fifth stack 53E is an extra stack which assists in blocking diffuse leaks, as described below. More generally, our invention is operable with sets of two or more such shortwave stacks. Typically, the shortwave blocking quarterwave stacks are designed to reflect or block light within the wavelength range about 380 to 1300 nm.

Referring further to FIG. 6, the exemplary set 54 of longwave blocking quarterwave stacks 54A–54B deposited on the set 53 of shortwave blocking quarterwave stacks comprises layers 64—64 of the materials tantala and silica formed by IAD or by sputtering. More generally, sets of two or more two stacks may be used. Typically, the exemplary longwave blocking quarterwave stacks are designed to reflect light within the wavelength range of about 380 to 720 nm.

Figure 5:
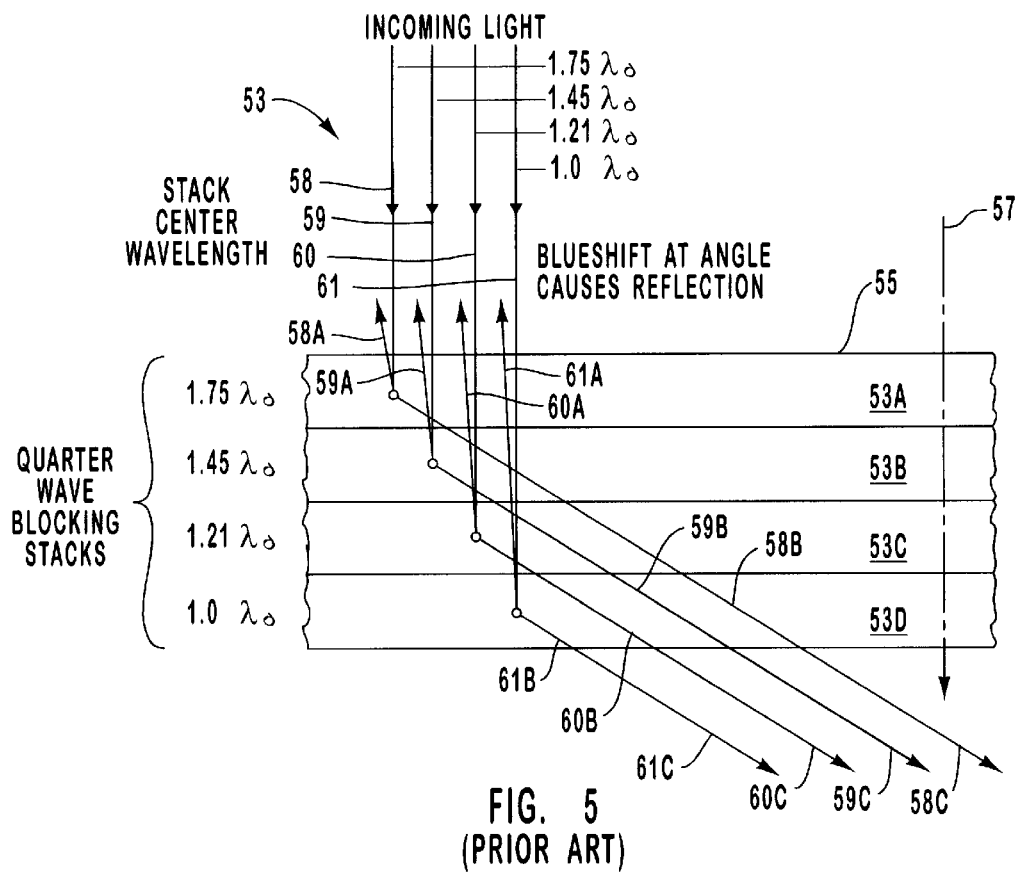
FIG. 5 is a vertical cross-section view, in schematic form (not to scale), of a prior art linear variable filter depicting the mechanism by which diffuse leaks occur.

As discussed relative to FIG. 5 in the Description of the Related Technology, diffuse leaks occur when the layers 63 and 64 contain defects such as light scattering material or rough surfaces, or imperfect between-layer interfaces. Light of wavelength 1.75 $\lambda_o$, 1.45 $\lambda_o$, 1.21 $\lambda_o$, and 1.0 $\lambda_o$, schematically indicated as rays 58–61, is outside the passband of wavelengths which the stack is designed to pass, and normally would be reflected or blocked. However, such defects may scatter the light 58–61 through the analyzer side 65 of the optical filter device 50, causing anomalous or erroneous operation of the device.

In contrast, in our filter design, the stacks within given sets 53 and 54 are arranged so that the magnitude of the characteristic center wavelength of each stack increases from stack to stack along the desired direction of traversal 57 of incident light through the filter 50. By way of example, and referring to the shortwave stack 53 shown in FIG. 7, the first through the fifth stacks 53A, 53B, 53C, 53D and 53E, respectively, have characteristic, center wavelengths 1.0 $\lambda_o$, 1.21 $\lambda_o$, 1.45 $\lambda_o$, 1.75 $\lambda_o$, 2.12 $\lambda_o$. Light 57, which is within the passband, has a wavelength, for example, of 3.00 $\lambda_o$, and thus traverses the shortwave blocking stacks without being reflected. Light 58, which has a wavelength of 1.75 $\lambda_o$, is partially reflected or blocked by the fourth stack 53D (as illustrated by 58A), but is partially scattered (see 58B) by the defects present within the fourth stack. However, the scattered light 58B cannot go through the fifth stack 53E because the apparent center wavelength of the fifth stack at the steep angle is shifted toward a shorter wavelength (blue shift) matching the light leaking through the fourth stack 53D. Instead of exiting the detector side 65 of the filter as a leak (see 58C, FIG. 5), this scattered light is reflected in a direction 58D which is different from and substantially opposite to the direction 58, and goes out the incident side 55 of the filter or is absorbed internally.

The same reflection mechanism is operative for the light 59, which has a wavelength of 1.45 $\lambda_o$, and has a diffuse leak components 59B which is reflected by the fourth stack 53D; the light 60, which has a wavelength of 1.21 $\lambda_o$, and a diffuse leak component 60B which is reflected by the third stack 53C; and light 61, having a wavelength of 1.0 $\lambda_o$, and a diffuse leak component 61B which is reflected by the second stack 53B. In short, the diffuse light is reflected generally back toward the incident side of the filter, that is, away from the exit side 65. The reflected light then is either reflected back out the incident side or absorbed within the filter, thus precluding it from leaking through the exit side 65 and causing errors or anomalies is the operation of the filter. By ordering the characteristic center wavelengths of the exemplary four stack set 53 and optionally incorporating a fifth stack to block diffuse light from the last of the four, diffuse leaks are substantially eliminated.

Please note, the above description and examples illustrate the utility of our invention in forming radially variable filters which have the performance characteristics of linearly variable filters, and in forming leak-free LVFs. However, our invention is not limited to the specific design or the exemplary filter(s). Rather, in view of the described preferred and alternative embodiments of our present invention and the specific working example of many layer, radially variable, leak-free LVFs, those of usual skill in the art will readily modify and adapt and extend the filter design and fabrication process in ways which are within the scope of the appended claims.

We claim:

1. A process for forming optical filters, comprising: rotating a substrate; using ion assisted deposition, forming on the rotating substrate a multi-layer, radially varying optical coating; and cutting a radial slice from the coated substrate, thereby forming an optical filter.

2. A process for forming an optical bandpass filter comprising a multilayer dielectric optical coating of selected, varied optical characteristics formed on a substrate, the process comprising:

providing rotation having planetary motion to at least one substrate;

using ion-assisted deposition, depositing at least a first layer of a first dielectric material on said substrate during said rotation;

using ion-assisted deposition, depositing at least a subsequent layer of a dielectric material different from said first dielectric material during said rotation;

during each said depositing step, masking said substrate thereby forming a layer of selected, radially varying optical characteristics;

during each said depositing step, controlling the ratio of ion assist to coating rate to control stress in the depositing layer, and adjusting the thickness of said first and subsequent layers to achieve a bandpass characteristic.

3. The process of claim 2, further comprising selectively forming on the substrate layers of a relatively low index of refraction material and layers of a relatively high index of refraction material to form a radially variable, wedge filter.

4. The process of claim 2, further comprising forming the optical coating on a single surface of the substrate, for preventing precessive light leakage.

5. The process of claim 3, further comprising selectively depositing the relatively low and relatively high retractive index materials on the substrate to form blocking stacks having associated characteristic wavelengths the magnitude of which increases in a selected direction through the device, for blocking diffuse light leakage.

6. The process of any of claims 2–5, further comprising cutting at least one radial section from the coated substrate.

7. An optical filter, comprising a radial slice of a substrate having a multi-layer, radially variable optical coating formed on the substrate by ion assisted deposition while rotating the substrate for controlling stress in the coating.

8. The optical filter of claim 7, wherein the device is a radially variable wedge filter comprising layers of relatively low index of refraction material and layers of relatively high index of refraction material.

9. The optical filter of claim 8, wherein the multi-layer coating is formed on a single surface of the substrate for preventing precessive light leaks.

10. An optical filter for suppressing precessive light leakage, comprising: a radial substrate slice having a multi-layer stack of layers of low refractive index and high refractive index materials coated on the substrate, wherein the substrate slice is a radial section of a substrate on which layers are formed with radially varying optical characteristics by ion-assisted deposition as the substrate is rotated, and the layers are formed on a single surface of the substrate.

11. An optical filter for suppressing diffuse leaks, comprising, a substrate blocking means, located on said substrate, for blocking diffuse leaks from traversing said filter in a selected direction, said blocking means comprising at least two stacks of layers of low refractive index and high refractive index materials coated on said substrate, each of said stacks blocking light of a characteristic wavelength, wherein said stacks are arranged so that the magnitude of the characteristic wavelength of each stack increases from stack to stack along said selected direction through said filter.

12. An optical filter for transmitting incident light of selected wavelength without transmitting diffuse leaks, comprising:

a substrate;

a bandpass filter formed on the substrate;

a first set of quarterwave stacks formed on the bandpass filter;

at least a second set of quarterwave stacks formed on the first quarterwave stack; and wherein at least selected stacks within the sets are blocking stacks for light of a characteristic wavelength and are arranged so that the magnitude of the characteristic wavelength of each stack increases from stack to stack along a selected direction through the filter, so that diffuse leaks are blocked from traversing said direction through the filter.

13. The optical filter of any of claims 7–12, wherein the filter coating comprises at least 200 layers.

14. An optical filter for transmitting incident light of selected wavelength without transmitting diffuse leaks, comprising:

a substrate;

a set of long wave pass stacks of increasing characteristic wavelength;

a bandpass filter;

a set of short wave pass stacks of increasing characteristic wavelength;

a bandpass filter;

a set of short wave pass stacks of increasing characteristic wavelength; and wherein at least selected stacks within the sets are blocking stacks for light of a characteristic wavelength and are arranged so that the magnitude of the characteristic wavelength of each stack increases from stack to stack along the direction of incident light through the filter, so that diffuse leaks are blocked from traversing through the filter.

15. The optical filter of claim 14, wherein the filter coating comprises at least 200 layers.

* * * * *

UNITED STATES PATENT AND TRADEMARK OFFICE
CERTIFICATE OF CORRECTION

PATENT NO. : 5,872,655
DATED : Feb. 16, 1999
INVENTOR(S) : Seddon et al.

It is certified that error appears in the above-identified patent and that said Letters Patent are hereby corrected as shown below:

Cover Page, Right Column, Abstract, line 10, after "materials" change "stich" to --such--

Col. 1, line 50, after "stacks" change "biocks" to --blocks--

Col. 2, line 46, before "imperfect" change "exist" to --exists--

Col. 2, line 53, after "Referring" change "how" to --now--

Col. 3, line 12, after "aspect," change "out invehtion" to --our invention--

Col. 3, line 59, after "coatings" change "ate" to --are--

Col. 4, line 6, after "through" change "ah" to --an--

Col. 4, line 7, after "accordance" change "With" to --with--

Col. 6, line 54, after "dielectric" change "linear-variabie" to --linear-variable--

Col. 7, line 34, after "stack" change "is" to --are--

Col. 8, line 43, after "bandpass" change "kilter" to --filter--

Col. 9, line 41, before "59B" change "components" to --component--

UNITED STATES PATENT AND TRADEMARK OFFICE
CERTIFICATE OF CORRECTION

PATENT NO.    : 5,872,655
DATED         : Feb. 16, 1999
INVENTOR(S) : Seddon et al.

It is certified that error appears in the above-identified patent and that said Letters Patent is hereby corrected as shown below:

Col. 12, line 8, after "wavelength;" delete "a bandpass filter; a set of short wave pass stacks of increasing characteristic wavelength;"

Signed and Sealed this

Fourth Day of April, 2000

Q. TODD DICKINSON

*Attest:*

*Attesting Officer*         *Director of Patents and Trademarks*